Patented Oct. 7, 1930

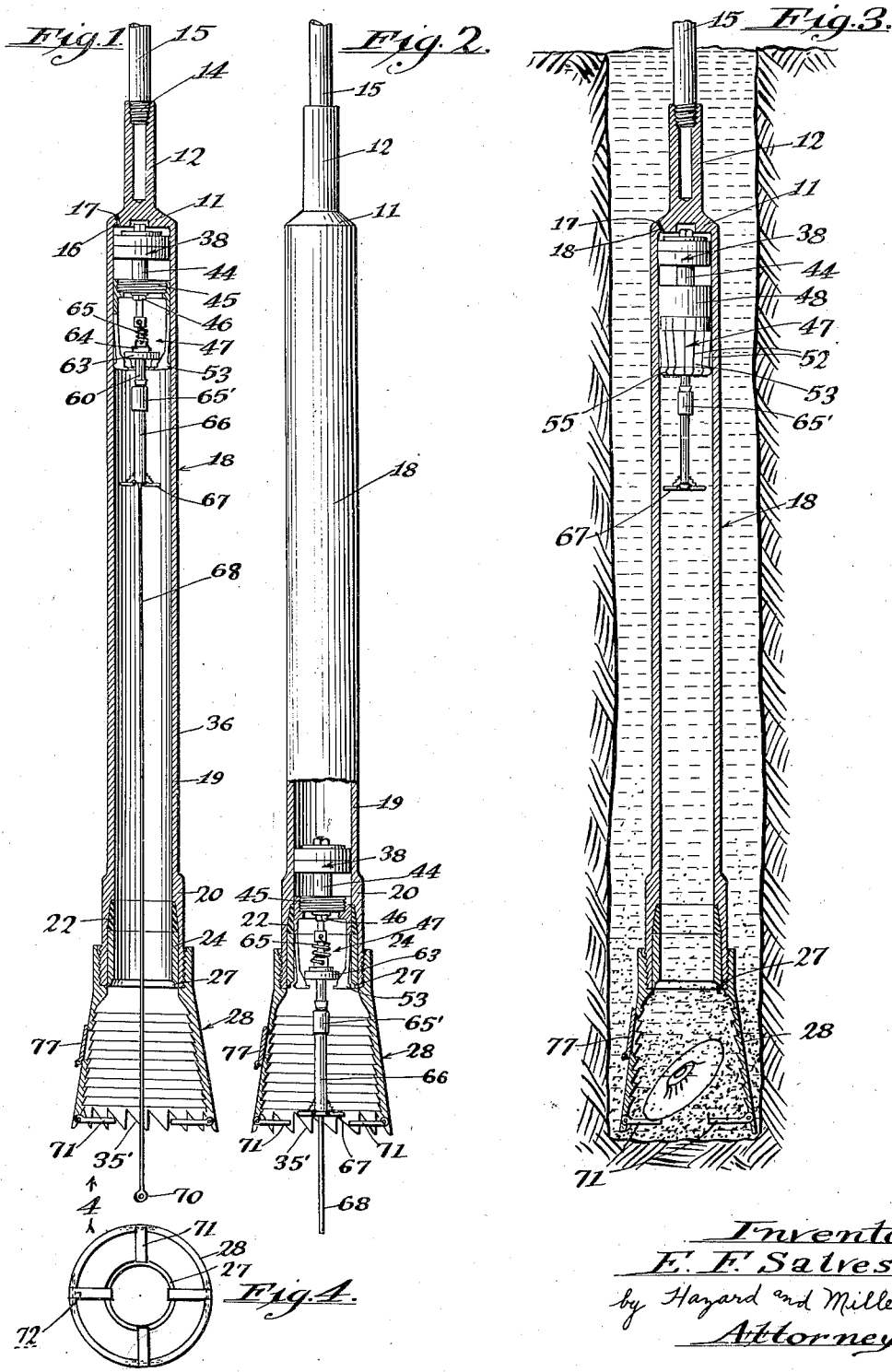

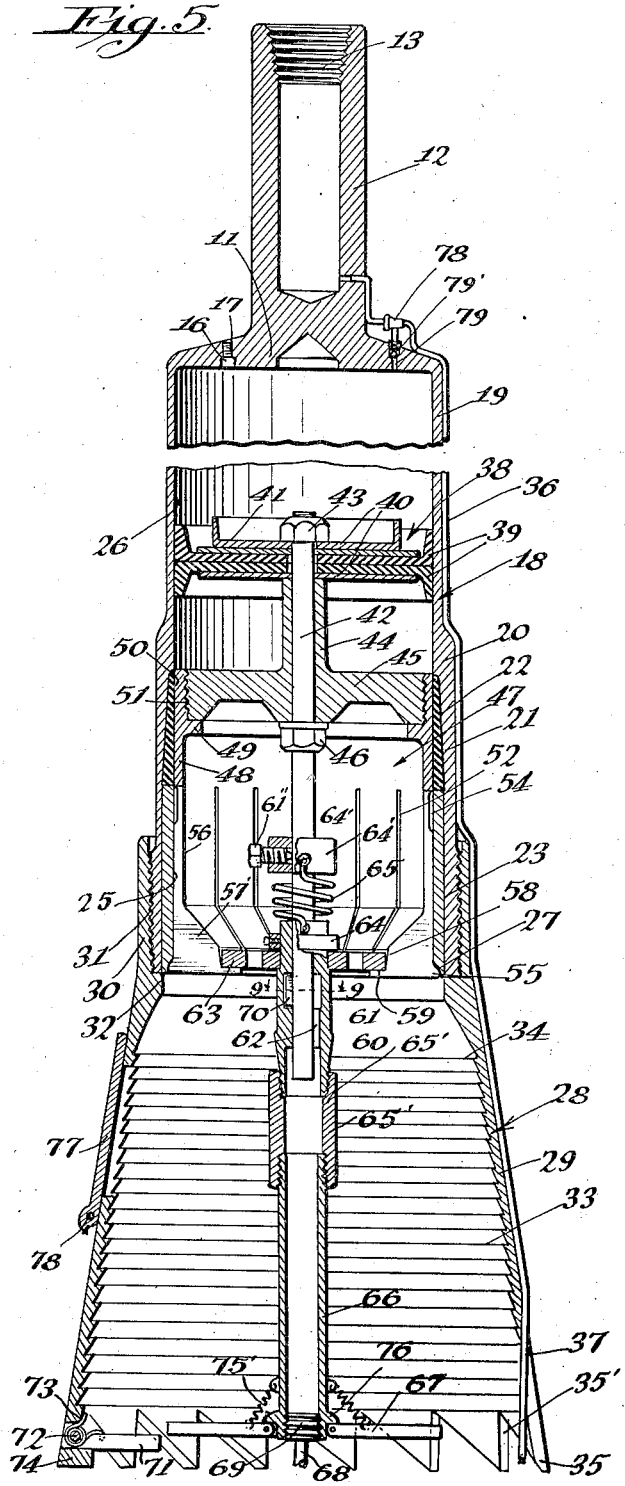

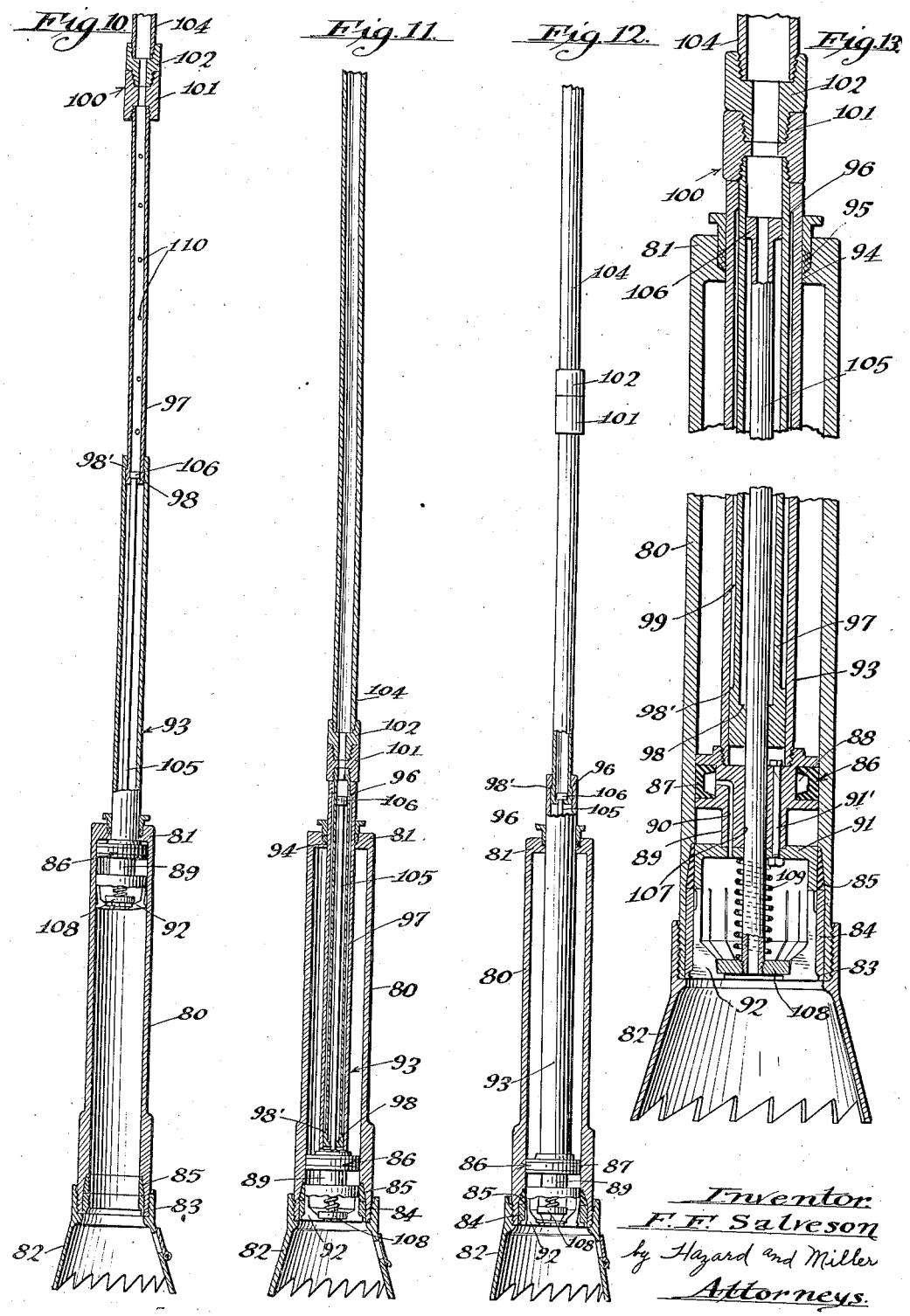

1,777,581

UNITED STATES PATENT OFFICE

ELMER FRANKLIN SALVESON, OF FULLERTON, CALIFORNIA

VACUUM FISHING TOOL

Application filed July 2, 1927, Serial No. 203,229. Renewed December 9, 1929.

My invention is a vacuum fishing tool for deep well boring to fish articles in the well. My invention also comprehends the method of fishing by using a vacuum or some other method of drawing the article with mud from the well into the bottom of the fishing tool and thereby raising the article incased in a body of mud or the like.

An object of my invention is to fish articles from a well by drawing such articles into a fishing tool having a hollow lower end and at the same time drawing a quantity of mud or other similar material from the well. The mud with the article to be fished is then trapped in the lower end of the fishing tool and may be raised to the surface of the well.

Another object of my invention is to draw or suck the mud with the article to be fished into the lower hollow end of the fishing tool by having a vacuum which, together with the external pressure, forces the lower end of such hollow fishing tool full of mud with the articles to be fished.

A more specific object of my invention is the construction of a fishing tool having a hollow chamber in the base, open at the lower end, for the reception of the mud and the article to be fished, and above this having a cylinder with a piston slidable therein. The cylinder is provided with a vent at the upper part so that at the surface of the well the air may be expelled and the vent closed with the piston in its upper position. Secured to the piston is a catch or a trigger device for holding the piston in its lower position, the piston being forcibly drawn downwardly in the cylinder by a suitable device and retained in the lower position with a vacuum created above the piston. The trigger device or catch is held in an outward position by a trigger holding and releasing disc or the like, which engages and forces the trigger elements outwardly, and this disc may be released by a projecting tube or bar which passes through the mud chamber and strikes the object to be fished in the downward lowering of the fishing tool.

My fishing tool and the manner and method of operation is illustrated in the accompanying drawings, in which:

Figure 1 is a vertical transverse section of the tool showing part of the internal mechanism in elevation, the piston being shown in its upper position.

Figure 2 is a side elevation of the fishing tool partly broken away at the base, showing the piston in its lower position.

Figure 3 is a vertical sectional view of the tool with the piston and its associated parts shown in elevation, drawn into the upper position by the vacuum and showing the article fished with a body of mud sucked into the mud chamber.

Figure 4 is a bottom view of the tool, taken in the direction of the arrow 4 of Fig. 1.

Figure 5 is a vertical section through the tool on an enlarged scale and showing the piston in its lower position, and latched or locked in such position.

Figure 6 is a side elevation of the piston and the trigger mechanism connected thereto.

Figure 7 is a plan of the piston, taken in the direction of the arrow 7 of Fig. 6.

Figure 8 is a bottom view of the trigger mechanism, taken in the direction of the arrow 8 of Figure 6.

Figure 9 is a detail cross section on the line 9—9 of Figure 5 in the direction of the arrows.

Figure 10 is a sectional elevation of another form of my fishing tool in which the device may be operated in the top of the well to form a vacuum, showing the device in a position for being lowered.

Figure 11 is a similar view with the fishing tool lowered into the well and the vacuum created therein.

Figure 12 is a similar view showing the parts in the position preceding the upward lifting of the suction producing mechanism.

Fig. 13 is an enlarged section illustrating the parts in the relation shown in Fig. 11.

The main stationary parts of the fishing tool are substantially as follows, having reference particularly to Figs. 1 to 5:

A cylinder head 11 has a tube 12 connected thereto, this having box threads 13 to connect to a pin 14 on a pipe 15, this latter supporting the fishing tool and being used in lowering same as well as for pumping flushing liquid therethrough. The head is provided with a vent 16 which is a threaded opening and this opening is closed by a plug 17. A cylinder section 18 extends downwardly from the head and at the upper part may have relatively thin walls 19, there being a thick wall section 20 at the lower part. This thick wall section has an annular elongated recess 21 in which is fitted a rubber or other packing ring 22. Below this ring there is a cylindrical section 23 in which is fitted a ring 24, having a sliding fit to compress this rubber. The inner surface 25 of the ring is of the same diameter as the inner surface 26 of the main body of the cylinder. The lower part of the ring 24 has an annular groove 27.

The mud chamber, designated generally by the numeral 28, has preferably bell shaped walls 29 and an upper cylindrical section 30, which has a screw threaded fit 31 with the outside of the cylinder 18, being secured to the thickened lower part. There is a shoulder 32 abutting against the lower edge of the main body of the cylinder and the pressed in ring 24. The belled walls 29 are provided with annular or other teeth 33 which incline upwardly or have a series of horizontal surfaces 34. The lower edge 35 of the belled mud chamber has teeth 35' dull, or sharp if desired. A flushing tube 36 extends from the lower part of the tubular section 12 above the cylinder, passing down the outside of same, and enters the belled end through an opening 37.

The piston, designated generally by the numeral 38, may be formed of flanged packing discs 39 placed back to back which are preferably formed of some soft material, such as leather, and outside of these are clamping plates 40. Above the upper plate I preferably use a cup 41. Through this assembly a piston rod 42 extends, having a nut 43 on the upper end bearing in the base of the cup 41.

This piston rod extends through a sleeve 44, the upper end of which sleeve bears against the lower plate 40. This plate has integral therewith a disc 45, the disc being clamped in place by a nut 46.

The trigger or catch mechanism, designated generally by the numeral 47, has a cylindrical upper part 48 with an internal rib 49, such rib fitting against the lower edge of the disc 45, and an upper flange 50 having a screw threaded connection 51 with the disc. The lower end of this cylinder has a series of splits or slots 52 forming a series of spaced trigger fingers 53, there being an annular groove 54 at the upper part of these fingers. At the lower part the fingers are provided with an annular rim or rib 55 extending outwardly. The upper part 56 of the trigger fingers is preferably cylindrical and the lower part has an upper cam surface 57 converging inwardly. Below this cam surface there is a cylindrical recess 58 with a shoulder 59 at the base.

A sleeve 60 is slidable on the lower part of the piston rod 42. This sleeve has an annular recess 61 and below this recess a slot 62. Rotatably mounted on the sleeve there is a trigger engaging the releasing disc 63, with openings therethrough, this disc being secured on the sleeve by engaging the shoulder and by means of the clamping collar 64. There is an upper collar 64' clamped on the sleeve and a tension spring 65 between the two collars. A coupling 65' is secured on the lower part of the sleeve 60 and there is a releasing tube 66 depending therefrom which has a hinged arm 67 connected thereto. A pulling rod 68 has a screw threaded head 69 which is threaded into the lower end of the releasing tube 66. A spline 70 is secured on the piston rod 42, fitting in the annular recess 61 and is adapted to pass through the slot 62 for a purpose hereunder set forth (see Fig. 5).

At the base of the mud receptacle I provide a series of traps 71, each of which is mounted on a pivot pin 72 with a coiled spring 73 interengaging between the pin, the trap and the bell, to swing the traps into a downward position, the limiting movement being by the lug 74 on the lower edge 35 of the bell.

The hinged arms 67 swivel downwardly so that they may readily pass into the cylinder and are pulled into the horizontal position by springs 75 and engage shoulder lugs 76 at the lower end of the tube 66. Also on the bell there are one or more traps 77 pivoted at the lower end 78, which traps in lowering the tool into the well open and allow the upward flow of sand and oil but are restrained from opening on the upward movement by the well casing. On the suction action, as hereunder mentioned, these traps close and allow the full force of the suction to operate through the open bell mouth.

I utilize an ejector 78' of an ordinary type which is connected through a duct 79 in the cylinder head 11, this duct having a ball valve 79'. This ejector 78' is connected in the flushing tube 36 so that when fluid is flushed through this tube it sucks air out of the upper part of the cylinder 19 and hence functions to maintain the vacuum therein, the ball valve 79' preventing air or oil passing into such chamber.

The manner of use and functioning of my vacuum fishing tool is substantially as follows:

The trigger fingers are made of resilient material so that such fingers normally are somewhat retracted so that the outer edge of the rib 55 and the cylindrical portion 48 fit inside of the cylinder 19 and have free sliding movement therein. When the device is assembled at the top of the well and fixed for lowering, the plug 17 is removed so that when the piston 38 is in its upper position substantially all the air may be expelled from the cylinder 19 and in this position it will be noted that the rib 55 of the trigger fingers and the main body of the fingers is retracted in the cylinder, as shown in Figs. 1 and 3.

The pulling rod 68 is inserted through the mud chamber and upwardly through the cylinder 19 when the piston is in the upper position and has its head 69 threaded into the lower end of the releasing tube 66. Before the piston has been drawn to the upper end of the cylinder 19, the tube 66 and its connected sleeve 60 have been given a turn so that the key or spline 70 on the piston rod may pass relatively downwardly through the slot 62 and engage the solid part of the sleeve below such slot. This action raises the sleeve 60 relative to the trigger fingers and positions the disc 63 above the cammed part 57 of such fingers, compressing the spring 65. When, by pulling down on the rod 68, the piston has been drawn to its lowest position, the annular rib 55 at the lower end of said fingers may be pressed into the annular groove 27 in the ring 24. The arms 67 are then adjacent the lower end of the bell and may be readily grasped so that the tube 66 and the sleeve 60 may be given a partial rotation while still being pulled and this action forces the key or spline 70 upwardly through the slot 62 in the sleeve 60 so that it engages in the annular groove 61. This action pulls the releasing disc 63 into the cylindrical recess 58, causing it to bear against the shoulder 59 at the base of the trigger fingers. These fingers are thus located in their outer position, the annular rib 55 being pressed tightly into the annular groove 27 and thus the piston is maintained in the lower position with the vacuum above same.

The pulling rod 68 is then removed from engagement with the tube 66 by unscrewing same and the tool is in position for lowering into the well. When the arm 67 or the lower end of this tube 66 pass downwardly in the well they cannot be displaced either upwardly or in a rotational manner by the oil or ordinary mud of the well but when a resistance is met, such as an object to be fished, the downward movement of the tool is stopped. As the tool is usually connected to a drill pipe, it is then given a partial rotation so that the key 70 is in alignment with the slot 62 which allows a relative upward movement of the sleeve 60 due to the pressure on the releasing rod 66, this upward action of the sleeve 60 carrying the releasing disc 63 away from the shoulder 59 and the cylindrical recess 58, thereby releasing the trigger fingers, which fingers on account of their natural inward stresses due to the resiliency disengage the rib 55 in the annular groove 27. Hence on account of the vacuum on the upper part of the cylinder 19, together with the external pressure, causes an upward movement of the piston. This action sucks mud with the article to be fished upwardly into the bell and part of such mud passing upwardly into the lower part of the cylinder 19.

In the ordinary downward movement of the tool through the oil, light sand and thin mud, these materials pass outwardly from the bell through the traps 77 which, as above mentioned, are pivoted at their lower ends and made to swing upwardly. The mud becomes packed in the bell and in the lower part of the cylinder and to a certain extent is prevented from outward flow by the traps 71 which are pivoted at the lower part of the bell, thus retaining the fish either in the bell or partly in the bell and partly in the lower part of the cylinder 19.

It will thus be seen that I have not only developed an appliance for fishing articles by drawing the article and a body of mud into the fishing tool, but that this comprises a method of fishing and also that by the use of a reduction of the pressure in the fishing tool compared with the external pressure, the mud with the article to be fished is forced into the tool. The preferable and simplest way of doing this is by creating a vacuum in the tool in seating the operating parts and causing this vacuum to function in drawing the mud into the tool.

In the construction of my fishing tool illustrated in Figs. 10 through 13, instead of creating the vacuum at the top of the well and lowering the fishing tool into the well, the tool is lowered without any vacuum being created therein and when it reaches the bottom of the well a vacuum is formed in the tool so that by releasing this vacuum the piston may be drawn upwardly, thereby sucking mud and the article to be fished into the bell and the lower part of the tool. In this construction I utilize a cylinder 80, having a head 81, and on the base of the cylinder there is a bell 82, the cylinder construction and the bell construction being substantially as above described, there being an annular groove 83 at the lower part of a loose fitting ring 84, this ring being adapted to bear upwardly against a packing ring 85. Slidably mounted in the cylinder there is a piston, designated generally by the numeral 86. This piston has a packing ring 87 with an annular chamber 88 inside such ring. Depending from the piston there is a block 89 which has a duct 90 therethrough leading to the chamber 88. A disc 91 is secured to the lower end of the block 89 by means of bolts 91'; the said duct 90 passing through such disc, and this disc has trigger fingers 92 secured thereto and preferably formed integral therewith, these fingers being of a resilient material and tending to spring inwardly in the same manner as the trigger fingers of the construction shown in Figs. 1 through 9. The piston has a pipe 93 connected thereto and this pipe has a sliding fit through an opening 94 in the head 81 of the cylinder 80, there being a packing gland 95 to form a seal. The upper shoulder 96 of this pipe extends a suitable distance above the head 81 when the triggers are secured in their lower position. A tube 97, having an internal shoulder 98 and external shoulder 98' at the lower end, is slidably mounted in the pipe 93. The main wall 99 of the tube 97 is slightly spaced from the pipe 93 and at the upper end it is secured to a coupling 100, this coupling having a box 101 to which is connected a pin 102, and above this there is a drill pipe 104 which may lead to the top of the well.

A tubular rod 105 is slidably mounted in the tube 97 and has a head 106 at the upper end. This head is adapted to engage the shoulder 98 on the lower part of the tube 97 when the fishing tool is being pulled into a well, as shown in Fig. 10, in which case the tube 97 is drawn outwardly to its full extent beyond the pipe 93.

This tube extends through an opening 107 in the block 89 in the disc 91 and has secured to its lower end a releasing disc 108, there being a coiled spring 109 surrounding the lower part of the tub and thrusting against the disc 91 and the releasing disc 108, normally tending to press said disc downwardly.

The manner of operation and functioning of my vacuum tool as illustrated in Figs. 10 through 13 is substantially as follows:

The tool, as above mentioned, is lowered into the well with the parts interfitting in the position shown in Fig. 10 and in which case the inner tube 97 by having its external shoulder 98' interengaging with the upper internal shoulder 96 of the outer pipe or sleeve 93, thus holding the piston in the upper end of the cylinder 80 and the tubular rod 105 is suspended by its head 106 engaging the internal shoulder 98 of the tube 97, this rod being of such length that when so suspended the releasing disc 108 is held above its seat.

When the bell strikes the bottom of the well or meets a sufficient resistance, the drill pipe continues downwardly so that the tube 97 telescopes in the pipe or sleeve 93 until the box 101 engages the upper end of this pipe 93. The weight of the drill pipe then forces the piston downwardly in the cylinder 80 and in so doing creates a vacuum on the upper side of the piston between same and the cylinder head 81. The piston is forced downwardly until the disc 91 is sufficiently depressed so that the trigger fingers are in a position to engage in the annular groove 83. They may be pressed down so that these fingers extend a considerable distance into the bell without doing any harm. The compression spring 109 is then sufficient to force the releasing disc 108 downwardly, the disc sliding against the internal cam shaped part of the fingers and pressing these outwardly so that they engage the annular groove 83, this action being aided by the weight of the tubular rod 105. The device is thus locked at the desired position in the well with a vacuum created back of the piston.

To release this vacuum the drill pipe is pulled upwardly and in so doing carries the box 101 above the upper end of the pipe 93 and draws the inner tube 97 out of such pipe, this action continuing until the head 106 of the pipe engages the internal shoulder 98 of the tube 97, which action gives a direct upward pull on the releasing disc 108 and draws it out of its seat. Hence the spring trigger fingers, having an inward tension, spring inwardly and allow the piston with the disc 91 and the fingers to be drawn upwardly due to the internal vacuum and the high external pressure in the base of the well, thereby sucking mud and the article to be fished into the open mouthed bell.

In the above operations the expansible ring 87 of the piston 86 is kept expanded by means of the connecting duct 90 between the internal chamber 88 back of the ring 87 and the external pressure in the well. The operation may be repeated by moving the drill pipe down and forcing the piston again to the lower part of the stroke, thereby creating a vacuum again, and again sucking the mud into the bottom of the bell by releasing the vacuum, and such operation may be repeated as many times as desired to give assurance that the article to be fished has been picked up.

From the above description it will be seen that I have not only developed an appliance and method of fishing in which the vacuum is created at the top of the well and brought into function or use at the bottom but that the vacuum may be created when the tool is in the well and released to function as above described.

In the construction of Figures 10 through 13 the tube 97 is provided with a series of apertures 110 which allow a free passage of liquids in the well in and out of said tube. Such liquids are expelled on the upward movement of the tubular rod 105 when the structure is moved from the position shown in Fig. 10 to that shown in Fig. 13. It will be noted that in this construction of Figures 10 through 13 a flushing fluid may be forced downwardly through the drill pipe 104, the tube 97, the tubular rod 105, and out through the cylinder 80 and the bell 82. The tension spring 65 functions to exert an upward pull on the sleeve 60 so that this action draws the solid central part of the sleeve against the spline 70, thus giving resistance to the rotation of this sleeve; however, when the main part of the tool is positively rotated and the sleeve held stationary due to the arms 67 or the lower end of the tube 66 engaging an article to be fished, or the bottom of the well. As soon as the spline is in alignment with the slot 62, the spring 65 draws the sleeve 60 upwardly, thereby drawing the spline into this slot. Hence on relative upward pressure on the tube 66 the releasing disc 63 is forced upwardly, disengaging from the trigger fingers and allowing their inward movement, hence allowing the upward movement of the piston in the cylinder, creating a suction.

Various changes may be made in the principles of my invention without departing from the spirit thereof, as set forth in the description, drawings and claims.

I claim:

1. A fishing tool having a hollow open lower end, means to initially create a vacuum in said fishing tool, and means to cause said vacuum to suck mud and an article to be fished into the open lower end of said tool.

2. A fishing tool having a hollow cylinder with an open lower end, a piston slidable therein, means to latch the piston adjacent the lower end of the cylinder whereby a vacuum may be created in the cylinder above the piston, and means to release the latching means to allow upward movement of the piston whereby mud and an article to be fished may be sucked into the lower end of the cylinder.

3. A fishing tool having a hollow cylinder with an open lower end, a piston slidable therein having a trigger device, means to close the cylinder with the piston at its upper end, means to draw the piston to a position adjacent the lower end of the cylinder, a locking means for the trigger device to retain the piston in its lowermost position, and means to release the locking means whereby the trigger device becomes released, the vacuum acting to suck mud and an article to be fished into the lower end of the cylinder.

4. A fishing tool comprising in combination a hollow cylinder having a bell structure at the lower end, such structure forming a mud chamber, a piston slidable in the cylinder, trigger fingers connected to the piston, a closable vent at the upper end of the cylinder, means to draw the piston from the upper to the lower end of the cylinder, a locking disc engaging the fingers to lock same in the latched position at the lower end of the cylinder, and means adapted to be actuated by an article being fished to operate said disc to release the fingers and allow upward movement of the piston, thereby sucking the article being fished and mud into the said mud chamber.

5. A fishing tool, as claimed in claim 4, the said trigger fingers having a normally retracted position in the cylinder, a cam surface at the rear of said fingers actuated by the disc to press said fingers outwardly, and means at the lower end of the cylinder to engage said outwardly moved fingers.

6. A fishing tool comprising in combination a hollow cylinder having a closable vent at its upper end and a bell forming a mud chamber at its lower open end, a piston slidable in the cylinder having a piston rod, a cylindrical structure on said rod having resilient trigger fingers connected thereto and extending downwardly inside of the cylinder, said fingers having a rib at their lower ends, means to draw the piston rod and the cylindrical structure downwardly, the cylinder having an annular groove to engage the ribs, means to press the fingers outwardly and lock the rib in the groove, and means adapted to be actuated by an article being fished to press said locking means upwardly and release said trigger fingers, such fingers moving inwardly and allowing the upward movement of the piston whereby an article fished and mud may be sucked into the said mud chamber.

7. A fishing tool, as claimed in claim 6, the means to draw the piston downwardly comprising a pulling rod insertable through the mud chamber in the lower part of the cylinder with means engageable with the piston rod whereby said pulling rod may draw the piston, hence the cylindrical structure and the fingers, downwardly.

8. A fishing tool comprising in combination a hollow cylinder having a closable vent at its upper end and a bell forming a mud chamber at its lower end, a piston slidable in the cylinder having a piston rod, a structure having a plurality of peripheral resilient trigger fingers connected to the piston rod, said fingers having a cam surface on the inner side, a locking disc engaging the cam surface of said fingers, a tubular structure connected to the disc, a rod having means to engage the piston rod and draw same downwardly, thereby pulling the resilient fingers and the piston downwardly, said disc being operable to expand the fingers to lock same with the lower end of the cylinder, said tubular structure on engagement by an article being fished being displaceable upwardly to release the trigger fingers, said fingers moving inwardly and allowing upward movement of the piston due to a vacuum above the piston, thereby sucking the fished article and mud into the said mud chamber.

9. A fishing tool, as claimed in claim 8, the mud chamber having traps pivotally connected thereto to fold upwardly in a lowering position and to extend horizontally in an operative position to retain mud, and said chamber having a series of serrations on its inner surface.

10. A fishing tool comprising in combination a hollow cylinder having a head and a tube connected to the head, said head having a closable vent, a bell connected to the lower open end of the cylinder forming a mud chamber, a piston slidable in the cylinder, having a piston rod with a cylindrical structure thereon, said cylindrical structure having resilient trigger fingers extending peripherally around same at the lower end, said fingers having an annular rib, the lower end of the cylinder having an annular groove to engage said rib, and each finger having a cam surface on its inner lower end, a locking disc connected to a tubular structure, slidable on the piston rod, a pulling rod insertable in the tubular structure being adapted and means engaging the piston rod to draw downwardly thereon, said tubular structure to be operable to draw downwardly on the disc, said disc being seated on the shoulder inside the fingers, locking the rib in the said groove, the said tubular structure being adapted to shift upwardly on engaging a fish and release the said trigger fingers, and the piston moving upwardly under the influence of vacuum, drawing the article fished and mud into the said mud chamber.

11. A fishing tool, as claimed in claim 10, a slushing duct extending from the tubular upper end of the cylinder to the lower end of the bell.

In testimony whereof I have signed my name to this specification.

ELMER FRANKLIN SALVESON.